United States Patent
Martin et al.

(10) Patent No.: US 9,482,521 B2
(45) Date of Patent: Nov. 1, 2016

(54) SYSTEMS FOR SPARSE APERTURE OPTICAL ALIGNMENT AND RELATED METHODS

(71) Applicant: RAYTHEON COMPANY, Waltham, MA (US)

(72) Inventors: Dylan William Rohyans Martin, Tucson, AZ (US); Rigel Quinn Woida-O'Brien, Tucson, AZ (US); Nicholas D. Trail, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 78 days.

(21) Appl. No.: 14/615,943

(22) Filed: Feb. 6, 2015

(65) Prior Publication Data

US 2016/0231106 A1 Aug. 11, 2016

(51) Int. Cl.
*G01B 11/02* (2006.01)
*G01B 11/27* (2006.01)
*G02B 23/10* (2006.01)
*G02B 7/182* (2006.01)

(52) U.S. Cl.
CPC ........... *G01B 11/272* (2013.01); *G02B 7/1822* (2013.01); *G02B 23/10* (2013.01)

(58) Field of Classification Search
CPC ............ G01B 11/272; G01B 9/02067; G01B 9/02068; G02B 7/1822; G01M 11/0271; G01M 11/00
USPC .......................................................... 356/508
See application file for complete search history.

(56) References Cited

U.S. PATENT DOCUMENTS

| | | | |
|---|---|---|---|
| 5,291,333 A | 3/1994 | Mills et al. | |
| 6,493,093 B2 | 12/2002 | Harasaki et al. | |
| 7,764,385 B1 | 7/2010 | Dey | |
| 8,456,644 B2 | 6/2013 | Evans et al. | |
| 9,213,190 B2 * | 12/2015 | Trail | G02B 23/06 |
| 2009/0302198 A1 | 12/2009 | Gonsalves | |
| 2010/0053634 A1 | 3/2010 | Lyon | |
| 2011/0157600 A1 | 6/2011 | Lyon | |
| 2013/0056650 A1 * | 3/2013 | Schulz | G02B 7/1822 250/491.1 |
| 2014/0218749 A1 | 8/2014 | Trail et al. | |

OTHER PUBLICATIONS

Ritva A. Keski-Kuha et al. "Development of Interferometry for Testing the JWST Optical Telescope Element (OTE)", SPIE, Po Box 10 Bellingham WA 98227-0010 USA, vol. 7010, 70100R, Jul. 12, 2008.

(Continued)

*Primary Examiner* — Jonathan Hansen
(74) *Attorney, Agent, or Firm* — Lando & Anastasi, LLP

(57) ABSTRACT

According to one aspect, a sparse optical system is provided. The sparse optical system includes optical segments, an optical source module to generate beams of light, a collimating module to direct the beams of light towards two adjacent optical segments, a detector to receive a reflection of the beams of light from the optical segments, and a processor. The processor instructs the optical source module to generate a first beam of light, determines a first measurement of an alignment of the two adjacent segments based on the reflection of the first beam, adjusts a position of an optical segment based on the first measurement, instructs the optical source module to generate a second beam of light, and determines a second measurement of the alignment of the two segments based on the reflection of the second beam.

21 Claims, 10 Drawing Sheets

(56) References Cited

OTHER PUBLICATIONS

International Search Report and Written Opinion for PCT/US2015/061811 mailed Mar. 24, 2016.

\* cited by examiner

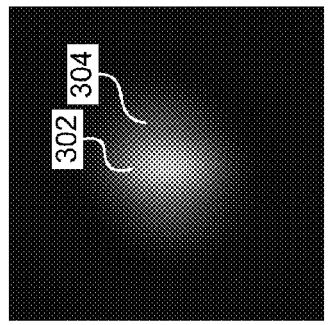
FIG. 3B
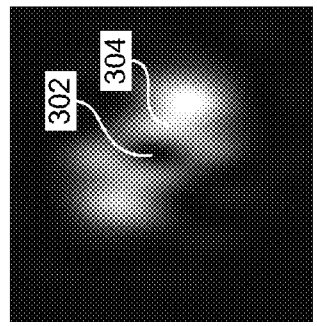
FIG. 3C
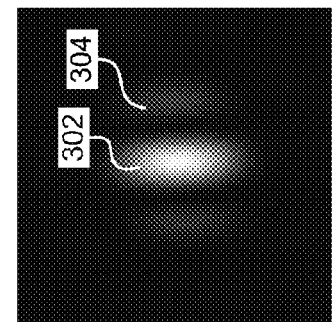
FIG. 3A
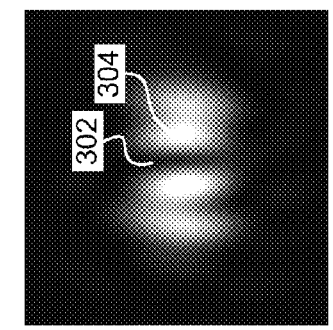
FIG. 3E
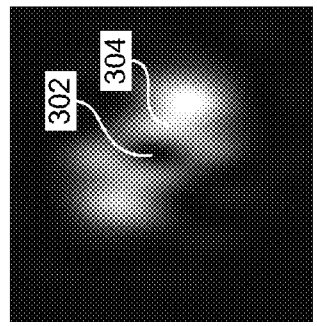
FIG. 3F
FIG. 3D

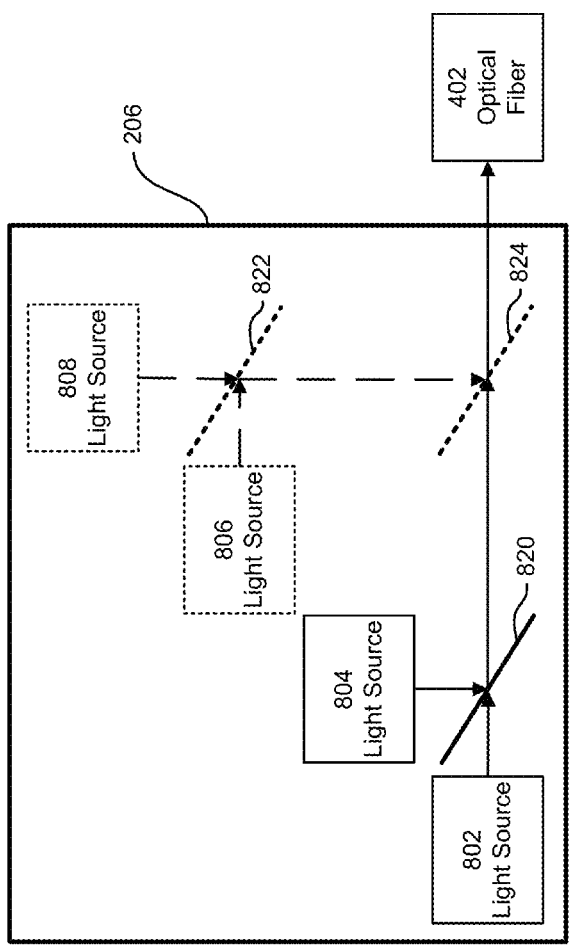
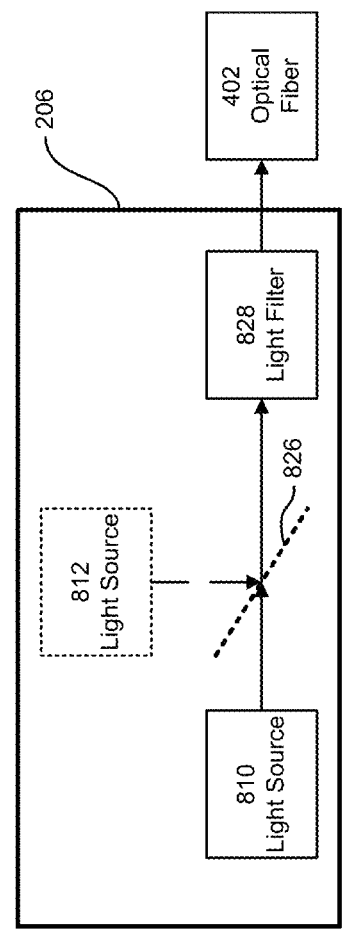
FIG. 8A
FIG. 8B

SYSTEMS FOR SPARSE APERTURE OPTICAL ALIGNMENT AND RELATED METHODS

BACKGROUND

Large aperture optical systems are advantageous in applications that require finer angular resolution (e.g., space telescopes). Large aperture optical systems, however, are challenging to manufacture and transport. To address these challenges, some optical systems are designed to be physically smaller for storage or delivery than when in use, to minimize the system's logistical footprint while maximizing the system performance by employing multiple optical elements (e.g., mirrors). To achieve more compact configurations, the optical elements may be physically moved closer to each other for storage than when in use. In the storage position, the elements do not need to be held in precise positions. Instead, the elements are placed for minimum volume and safekeeping. During use, the elements would be deployed to an operational configuration of the telescope and retained therein. In some instance, the system may be designed to allow multiple movements between the storage and use configurations.

These compact optical systems, however, introduce new challenges. In particular, the multiple optical elements need to be precisely aligned while in the operational configuration. This is required to allow the multiple independent "child" optical members to act as a single profile and mimic the desired "parent" surface when utilized. For example, the required accuracy to position each optical element relative to one another is on the order of a millionth of an inch.

SUMMARY OF INVENTION

Aspects and embodiments relate to mechanisms and methods for precision alignment of segmented minors of an optical system, during both initial calibration and use. More particularly, various aspects and embodiments relate to optical sources and related methods for aligning optical segments.

According to one aspect, a sparse optical system is provided. The sparse optical system includes an optical element including a plurality of optical segments arranged in a sparse aperture configuration, an optical source module configured to generate a first beam of light having a first set of characteristics and a second beam of light having a second set of characteristics, at least one collimating module coupled to the optical source module, the collimating module configured to direct the first beam of light and the second beam of light towards at least two adjacent segments of the plurality of optical segments, a detector configured to receive a reflection of at least one of the first beam of light and the second beam of light from at least one of the plurality of optical segments, and a processor coupled to the detector and the optical source module. The processor is configured to instruct the optical source module to generate the first beam of light, determine a first measurement of an alignment of the at least two adjacent segments based on interference patterns of the reflection of the first beam, adjust a position of at least one segment of the at least two adjacent segments based on the first measurement, instruct the optical source module to generate the second beam of light, and determine a second measurement of the alignment of the at least two segments based on interference patterns of the reflection of the second beam.

In one embodiment, the optical source module includes a first light source to generate the first beam of light and a second light source to generate the second beam of light. In this embodiment, at least one of first light source and the second light source may include at least one of a light emitting diode, a laser, and a superluminescent diode. The optical source module may include a combiner constructed to combine the first beam of light with the second beam of light to form a third beam of light having a third set of characteristics.

In one embodiment, the optical source module includes a light source and a light filter configured to filter light from the light source. In this embodiment, the light filter may include a first state and a second state, and wherein the optical source module is configured to generate the first beam of light by configuring the light filter into the first state and to generate the second beam of light by configuring the light filter into the second state.

In one embodiment, the first measurement is a coarse measurement and the second measurement is a fine measurement. In this embodiment, the first set of characteristics may include a coherence path length of at least 4.9 µm and the second set of characteristics may include a coherence path length of no more than 4.9 µm.

In one embodiment, the at least one collimating module includes a plurality of collimating modules, and wherein the system further comprises an optical demultiplexer coupled between the optical source module and each collimating module of the plurality of collimating modules. In this embodiment, each collimating module of the plurality of collimating modules may be configured to direct a respective beam of light towards a unique pair of two adjacent segments, and wherein the detector is configured to simultaneously receive a reflection of the respective beams of light from each unique pair of two adjacent segments.

In one embodiment, the system further includes an optical fiber coupled between the optical source module and the at least one collimating module. In one embodiment, the at least one collimating module includes a collimating optic, a folding optic, and an iris. In one embodiment, the optical element is one of a reflective optical element and a refractive optical element. In one embodiment, the processor is further configured to determine whether the alignment of the at least two adjacent segments matches a predetermined alignment based on the interference patterns of the reflection of the second beam.

According to one aspect, a method for aligning a plurality of optical segments in a sparse aperture configuration of an optical device is provided. The method includes directing a first beam of light from an optical source located on the sparse aperture optical device towards at least two adjacent segments of the plurality of optical segments, receiving a reflection of the first beam of light from the at least two adjacent optical segments at a detector, determining a first measurement of an alignment of the at least two adjacent segments based on interference patterns of the reflection of the first beam, adjusting a position of at least one segment of the at least two adjacent segments based on the first measurement, directing a second beam of light from the optical source towards the at least two adjacent segments, receiving a reflection of the second beam of light from the at least two adjacent optical segments at the detector, and determining a second measurement of the alignment of the at least two adjacent segments based on interference patterns of the reflection of the second beam.

In one embodiment, the method further comprises adjusting the position of the at least one segment based on the second measurement. In one embodiment, the method further comprises filtering the first beam of light to produce the second beam of light. In one embodiment, directing the first beam includes directing the first beam with a first set of characteristics, and wherein directing the second beam includes directing the second beam with a second set of characteristics.

In one embodiment, directing the first beam of light includes directing the first beam of light at a plurality of unique pairs of two adjacent segments. In this embodiment, directing the second beam of light may include directing the second beam of light at the plurality of unique pairs.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIGS. 3A-3F are example image pattern outputs of an optical device;

FIGS. 8A-8B are representations of portions of an optical device;

DETAILED DESCRIPTION

Figure 1:
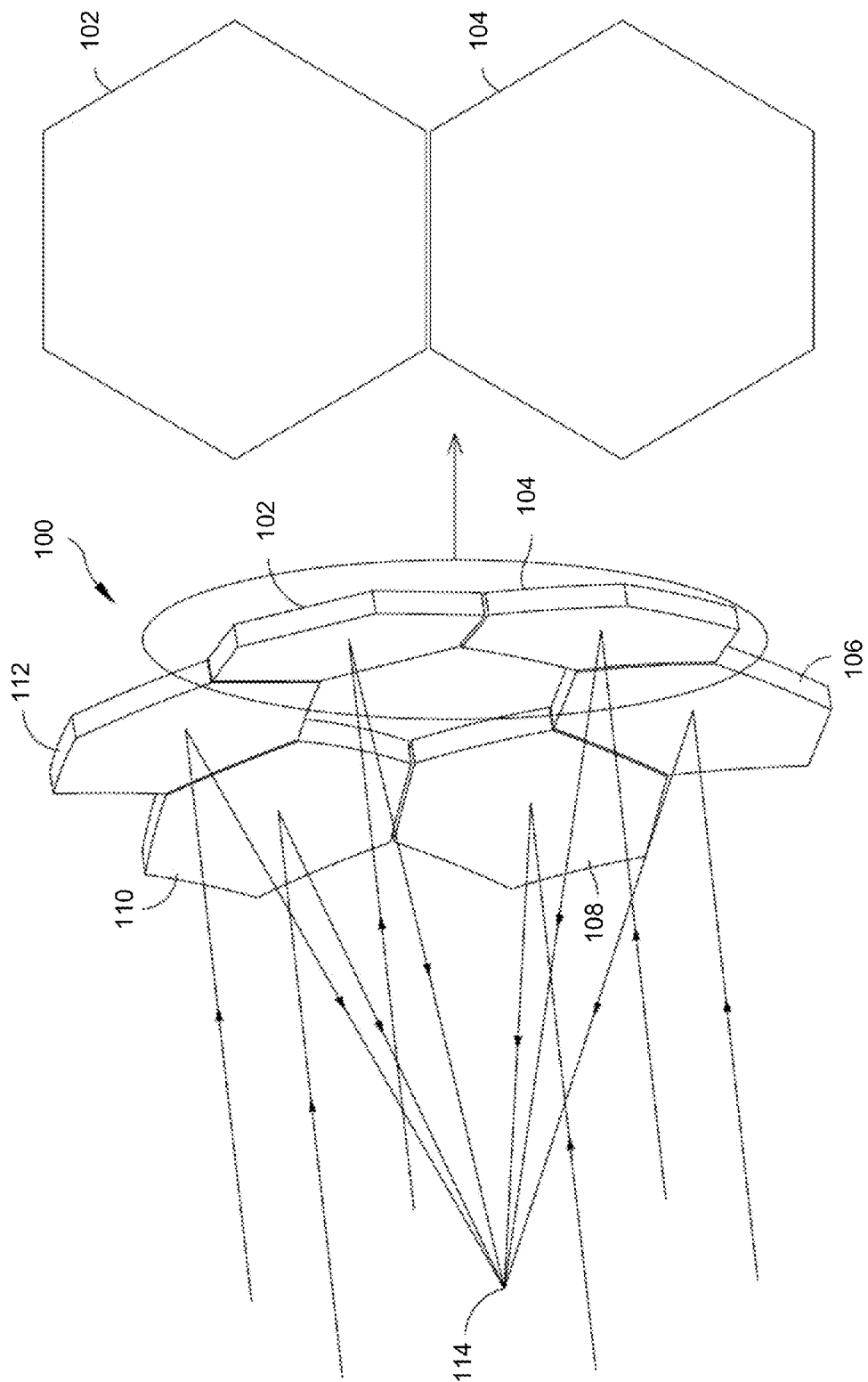
FIG. 1A is a side view representation of portions of an optical device.
FIG. 1B is a front view representation of portions of an optical device.

Aspects and embodiments are directed to systems and methods for configuring an alignment of optical segments of an optical device. For example, the optical device can be any optical device including optical segments that move or fold. For example, the optical device can be a telescope, such as a telescope with a sparse aperture configuration, where the entrance pupil of the telescope is partially blocked or omitted due to breaks in the physical architecture or optical elements. The telescope can have a primary mirror, a secondary mirror, and/or various refractive optical elements (referred to as reflective, refractive and catadioptric systems). In one implementation, the primary minor can be made up of multiple smaller mirror segments, referred to as child members, which mimic the optical figure of that parent surface when in alignment. The mirror segments can be moveable, allowing the primary minor to be folded into a smaller area. For example, the primary mirror can be folded up during transport of the telescope, or through deployment of a space-bound orbiting telescope. Once deployed, according to aspects and embodiments, the mirror segments can be unfolded and aligned precisely relative to each other and to other optical elements of the telescope, allowing full utilization and performance of the telescope and potentially larger collection aperture in the system (versus the storage configuration footprint).

The minor segments can be aligned using various processes, such as for example, an interferometer procedure. As discussed in further detail below, the interferometer procedure includes controlling the position and incident angle of a beam of light at a spot location in proximity between two mirror segments so that the beam footprint hits both mirror segments simultaneously. The reflection of the beam of light from both mirror segments can be detected and relative position with interference and coherent summation of the light can be used to determine the alignment of the two segments relative to each other. Light with varying characteristics can be employed to make course adjustments followed by finer adjustments to align the mirror segments.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1A, an optical device 100 includes a plurality of optical segments 102, 104, 106, 108, 110, and 112. The optical segments 102-112 can be mirror segments of the optical device 100, which can be a telescope. The "child" optical segments 102-112 can be aligned to simulate the functionality of a larger "parent" mirror encompassed in the optical device 100, for example. By segmenting a larger minor, the optical device can be folded to occupy a smaller space, such as during transport or deployment of the optical device, allowing for a lower logistical cost structure. Smaller segments of the minor can also be cheaper and/or easier to manufacture than a larger minor that is not segmented. In some embodiments, the optical segments 102-112 are arranged in a petal formation, with a central segment (not illustrated) surrounded by the other optical segments 102-112. Each optical segment 102-112 can be the same size and shape, or have different shapes and sizes in order to facilitate packaging or end-use requirements. The optical segments 102-112 can be arranged so that each optical segment 102-112 is in close proximity to one or more adjacent optical segments. For example, the optical segments 102-112 can be arranged to contact and/or nearly contact each other when he optical segments 102-112 are properly unfolded and aligned. In some embodiments, space remains between some or all of the optical segments 102-112 in the unfolded position. While FIG. 1 shows six optical segments 102-112, the optical device 100 an include any appropriate number of optical segments constituting a larger optical element. In some embodiments, the optical segments constitute a larger optical element that is a refractive (versus as shown reflective) optical element.

In some embodiments, the optical segments 102-112 are aligned such that the larger optical element 100 is a concave reflective surface. However, it is understood that the optical segments can be other shapes, sizes and arrangements so as to make up another shaped larger optical segment (e.g., a larger mirror segment). The optical segments 102-112, and therefore the larger optical element 100, can reflect light beams received by the optical device to focus the light beams at a focal point 114.

In some embodiments, a secondary optical element (not illustrated) is located at or near the focal point 114. The secondary optical element can be a mirror or refractive lens. It is also to be appreciated that the secondary optical element can be or can include an optical source, providing for a viable location of the optical beams for the alignment procedures discussed herein. In certain examples, the secondary optical element can be a smaller minor than the larger mirror constituted by the optical segments 102-112. In some embodiments, the secondary optical element is a mirror smaller than any of the optical segments 102-112. In some embodiments, the secondary minor may be replaced by a prime-focus detector or various refractive lenses and detector, and still provide for a viable location for the source of the optical alignment beams discussed herein.

In some embodiments, light received by or incident upon the optical segments 102-112 of the optical device 100 is reflected by the optical segments 102-112 to the secondary optical element. The secondary optical element reflects the light toward a detector (e.g., a focal plane array), which detects the light and which is used in combination with a processor and algorithms to generate an image of one or more sources of light or one or more objects that reflected the light received by the optical device 100. For example, the optical device 100 can be a telescope in space, orbiting the earth. The telescope can receive light reflected or emitted by the earth to generate images of the earth, and the alignment approaches discussed herein provide for an on-orbit capable, in-situ feedback to maintain optical performance throughout adverse environments.

In some embodiments, the optical segments 102-112 are hexagonal segments configured in a petal arrangement when unfolded. However, it is understood that the optical segments can be other shapes, sizes and arrangements so as to make up a larger mirror segment. As noted herein, the alignment of the optical segments 102-112 can affect the performance of the optical device. For example, the performance of the overall device can be affected by any of the alignment of the optical segments 102-112 relative to each other, the alignment of the optical segments 102-112 relative to other optical elements in the optical device, the alignment of the optical segments 102-112 relative to the body of the optical device, as well as a combination of any of the above. FIG. 1B also shows an example front view of two of the optical segments 102, 104, which are referenced in later figures in describing various systems and methods for aligning the optical segments 102-112.

Figure 2:
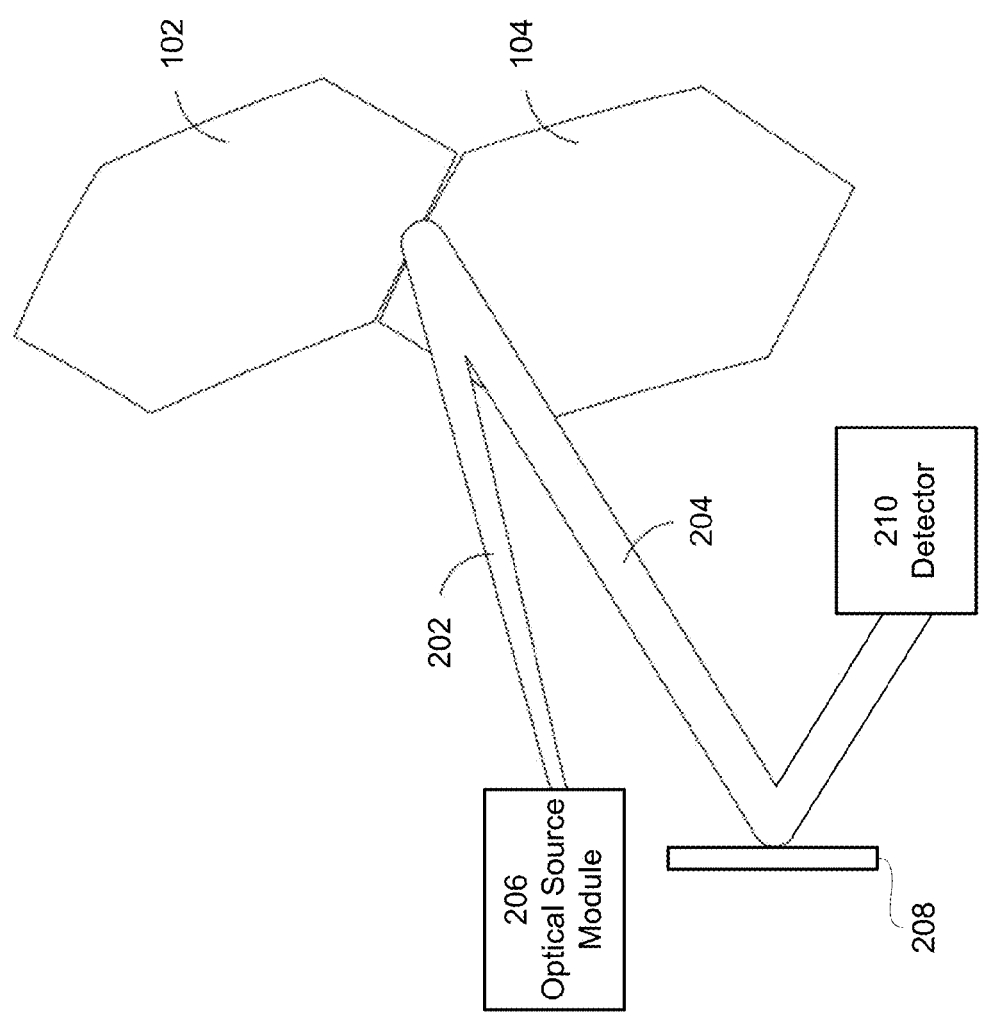
FIG. 2 is a representation of portions of an optical device.

Referring to FIG. 2, an interferometer procedure can be used to align optical segments 102, 104. In some embodiments, the interferometer procedure includes directing a light beam 202, generated by optical source module 206, on two optical segments 102, 104. The light beam 202 is then reflected as two separate, yet coherent, beams 204 off of the two optical segments 102, 104 toward a secondary optical element 208. The secondary optical element 208 reflects the coherent light beams 204 to a detector 210, which senses the reflected light. In some embodiments, the reflected light beams 204 can be analyzed using white-light interferometry techniques. For example, the first optical segment 102 can act as a reference surface and the second optical segment 104 can act as a test surface. As the light beam 202 is reflected off of both optical segments 102, 104, the resulting reflected light beams 204 are a linear and coherent combination of the reflected wavefront from both optical segments 102, 104. The detector 210 can be used to generate an image of the reflected light beams 204, which provides information regarding the alignment of the optical segments 102, 104. It is appreciated that one or more optical elements may be placed between the optical source module 206 and the optical segments 102, 104. For example, the optical source module 206 may direct light into one or more segments of optical fiber that guide the light to a collimating lens directed at optical segments 102, 104.

The optical segments can be adjusted using various methods based on the detected image generated by the reflected light beams 204 on the detector 210. In some embodiments, each minor segment is attached to a multi-degree of freedom adjustable mount (e.g. such as a 3-axis mount, to control the segment tip-tilt-piston in real-time after being deployed) that receives instructions from another device (e.g., a processor of the optical device) to control movement and relative alignment. The adjustable mount can then control the tip and/or tilt (e.g., X-axis and Y-axis rotation) in addition to relative position of optical segments based on the received instructions. In this manner, the system can operate on a "closed-loop" feedback approach, to align the mirror segments relative to each other very accurately during deployment and intermittent with its normal functions (to maintain stability and alignment). It is appreciated that other methods may be employed as described in commonly-owned U.S. Patent Publication No. 2013/0201571 filed Feb. 3, 2012, titled "HINGE MECHANISM FOR SMALL OPTICS AND RELATED METHODS," which is hereby incorporated herein by reference in its entirety.

In some embodiments, the light pattern generated by the reflected light beam 204 on the detector 210 is employed to align optical segments 102 and 104. For example, FIG. 3A shows an example image pattern generated by light beams 204 when optical segments 102, 104 are aligned as desired. The image pattern can be analyzed (e.g., by a processor coupled to the detector 210) to determine the alignment of optical segments 102, 104. The location of a center 302 of the image pattern can provide information related to a tip and/or a tilt of the optical segments 102, 104 as described further below. In addition, the side fringe 304 measured around the center 302 can provide information related to an offset of the optical segments 102, 104 with respect to the longitudinal axis of the optical device. Thus, in some embodiments, such image patterns can be obtained by a process and/or used by an algorithm and processor to control adjustment of the optical segments 102, 104 until an image pattern similar to the image pattern in FIG. 3A is generated by the light beams 204.

FIG. 3B shows an example image pattern generated by the light beams 204 while optical segments 102, 104 are spaced too far apart. The fringed 304 has moved closer to the center 302 relative to the image pattern illustrated in FIG. 3A.

FIG. 3C shows an example image pattern generated by the light beams 204 while the optical segments 102, 104 that are further spaced apart relative to FIG. 3B. The fringe 304 has moved yet closer to the center 302 and blend together. This information can be used, for example, in an iterative process to determine that the minor segments are being moved in such a manner as to be further misaligned as opposed to further improve alignment. Thus, in some embodiments, the interferometer procedure can generate similar image patterns which can be used to adjust the alignment of the two optical segments until the desired alignment is achieved.

The interferometer procedure may be employed to determine tip and/or tilt (e.g., X-axis and Y-axis angular errors) in addition to relative position errors of optical segments 102, 104 based on the image pattern detected by the detector 210. For example, FIG. 3D shows an example image pattern generated by light beams 204 while the optical segments 102, 104 are aligned as desired similar to FIG. 3A. The location of a center 302 of the pattern can provide information related to a tip and/or a tilt of the optical segments. FIG. 3E shows an example image pattern generated by light beams 204 while optical segments 102, 104 have an X-axis tilt. The center 302 shown in FIG. 3E has split into two brighter fringes. FIG. 3F shows an example image pattern generated by light beams 204 while optical segments 102, 104 have a Y-axis tilt in addition to the X-axis tilt illustrated in FIG. 3E. In addition to the changes to the center illustrated in FIG. 3E, the fringe 304 has rotated around the center 302. Thus, in some embodiments, such image patterns can be obtained by a process and/or used by an algorithm and processor to control adjustment of the tip and/or tilt of optical segments until an image pattern similar to the image pattern in FIG. 3D is generated by the reflected light beam.

In one embodiment, the center 302 of the various image patterns illustrated in FIGS. 3A-3F are at a center of detector 210, or at a predetermined reference point on detector 210. For example, the detector 210 may receive a plurality of image patterns each with a center 302 at a different predetermined location on the detector without interference between the plurality of image patterns. Simultaneously receiving the plurality of image patterns on the detector 210 can facilitate simultaneous alignment of multiple optical segments. It is appreciated that the interferometer procedure, in this embodiment, may include additional steps of correcting offset errors introduced into the optical device to project multiple sets of reflected light beams 204 at different locations on the detector 210.

Figure 4:
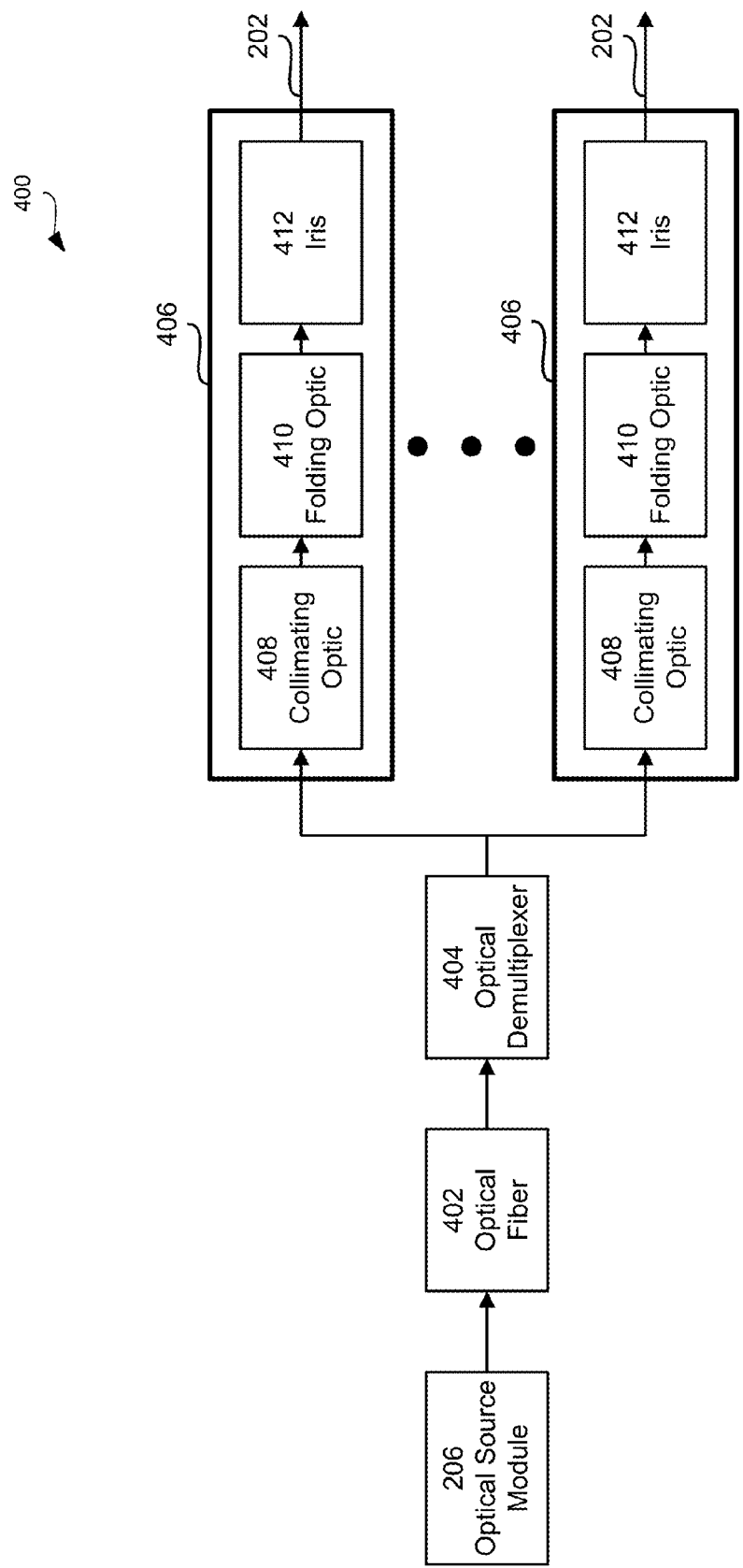
FIG. 4 is a representation of portions of an optical device.

In some embodiments, the light generated from the optical source module 206 is not directly incident on optical segments 102, 104. For example, the optical source module 206 may be placed remotely and one or more optical transports may be employed to guide the light from the optical source module 206 to the appropriate location to be incident on optical segments 102, 104. FIG. 4 shows an example remote optical source system 400. The remote optical source system includes an optical source module 206, optical fiber 402, an optical demultiplexer 404, and one or more collimating modules 406. Each of the collimating modules 406 includes a collimating optic 408, a folding optic 410, and an iris 412.

In a remote optical source system 400, the optical source module 206 generates light that is guided from the location of the optical source module 206 to an optical demultiplexer 404 by an optical transport (e.g., optical fiber 402). The optical demultiplexer 404 generates multiple light beams based on the light beam received from the optical source module 206. Each of the light beams generated by the optical demultiplxer may be provided to a respective collimating module 406. It is appreciated that each respective collimating module 406 may be coupled to an output of the optical demultiplexer 404 by an optical transport. The collimating modules 406 collimate the light received from the optical demultiplexer 404 and direct the light towards two optical segments being aligned. The collimating modules 406 collimate and direct the light to generate light beam 202 by, for example, employing a collimating optic 408 (e.g., a singlet lens), a folding optic 410 (e.g., a 90 degree prism), and an iris 412 (e.g., a pinhole aperture) in succession. It is appreciated that other combinations of optical devices may be employed in collimating modules 406 to form beam 202 and the collimating modules 406 may include alignment optical devices to facilitate adjustment of the degree of collimation and angular direction of the light beam 202.

In one embodiment, the remote optical source system 400 includes a number of collimating modules 406 equal to the number of optical segments to align. For example, the optical device may need to align eight optical segments and the remote optical source system 400 may include eight collimating modules 406. In this example, each respective collimating module 406 may be constructed to direct the light beam 202 at a respective alignment location. Employing the aforementioned remote optical source system 400 may enable all eight optical segments to be aligned simultaneously. For example, a known bias angle may be input to the collimating modules 406 and/or child member mirrors and the reflected image patterns on the detector 210 may appear at different locations. Thus, the detector 210 can distinguish between each image pattern and capture all 8 image patterns simultaneously.

Figure 5:
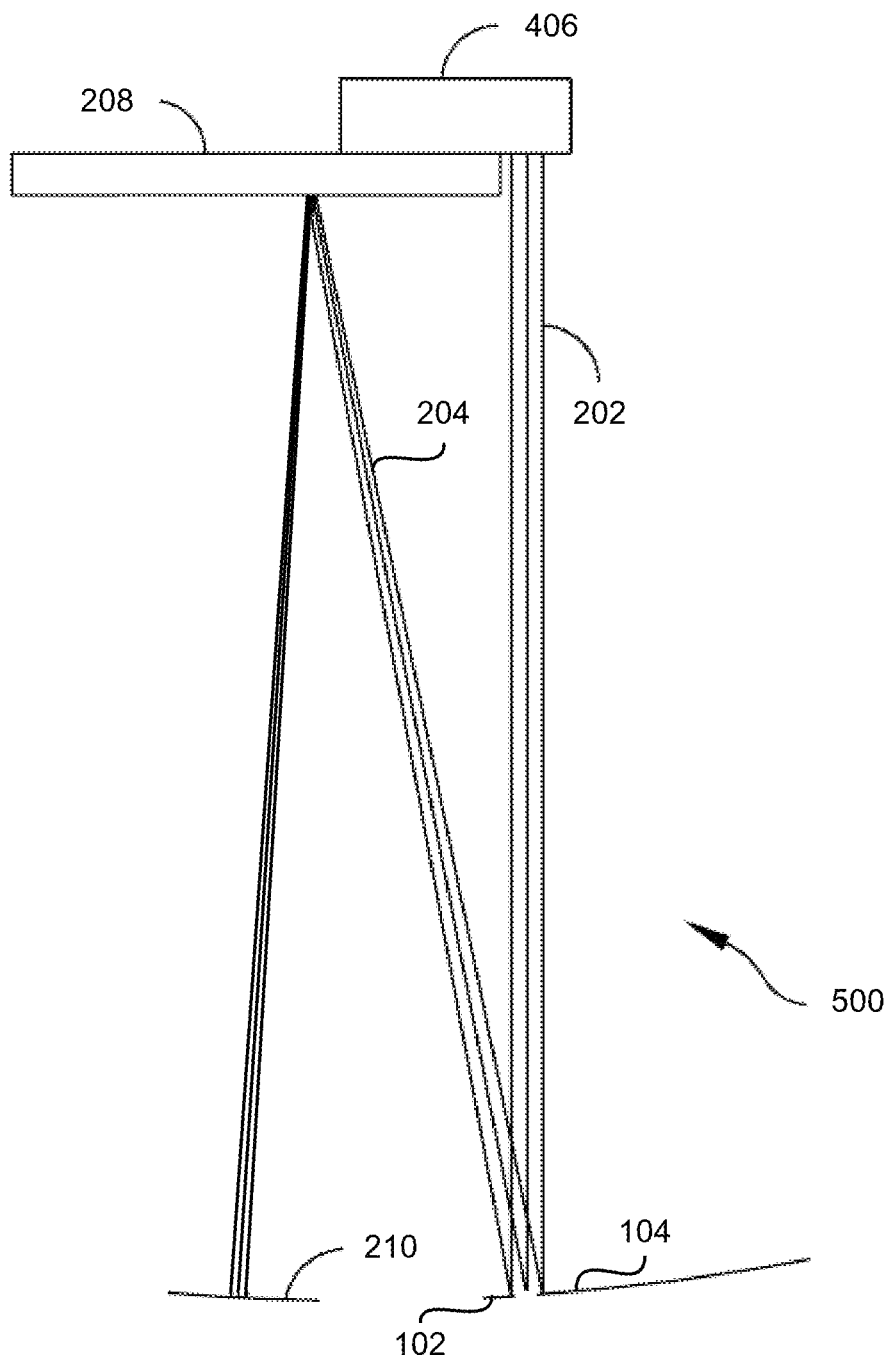
FIG. 5 is a representation of portions of an optical device.

As discussed above, the optical source module 206 may be placed remotely in the optical device. FIG. 5 shows an example optical device configuration 500 employing a remote optical source system 400 as previously described with reference to FIG. 4. The optical device configuration 500 includes collimating module 406 placed on a back of a secondary optical element 208. The collimating module 406 can be placed overhanging the edge of the secondary optical element 208 so that a light beam 202 can be directed at optical segments 102, 104. The reflected light beam 204 is then directed towards the secondary optical element 208, which reflects the light beam at detector 210. The detector 210 detects the light and a processor can use the information to adjust the alignment of the optical segments 102, 104 as described herein.

In the optical device configuration 500, the optical source module 206 (not illustrated in FIG. 5) may be placed in the base of the optical device. For example, the optical source module 206 may be placed in a base of the optical device behind the optical segments and coupled to the collimating module 406 by optical fiber 404 (not illustrated in FIG. 5) run through one or more mechanical struts that would be required to hold the secondary optical element 208.

Figure 6:
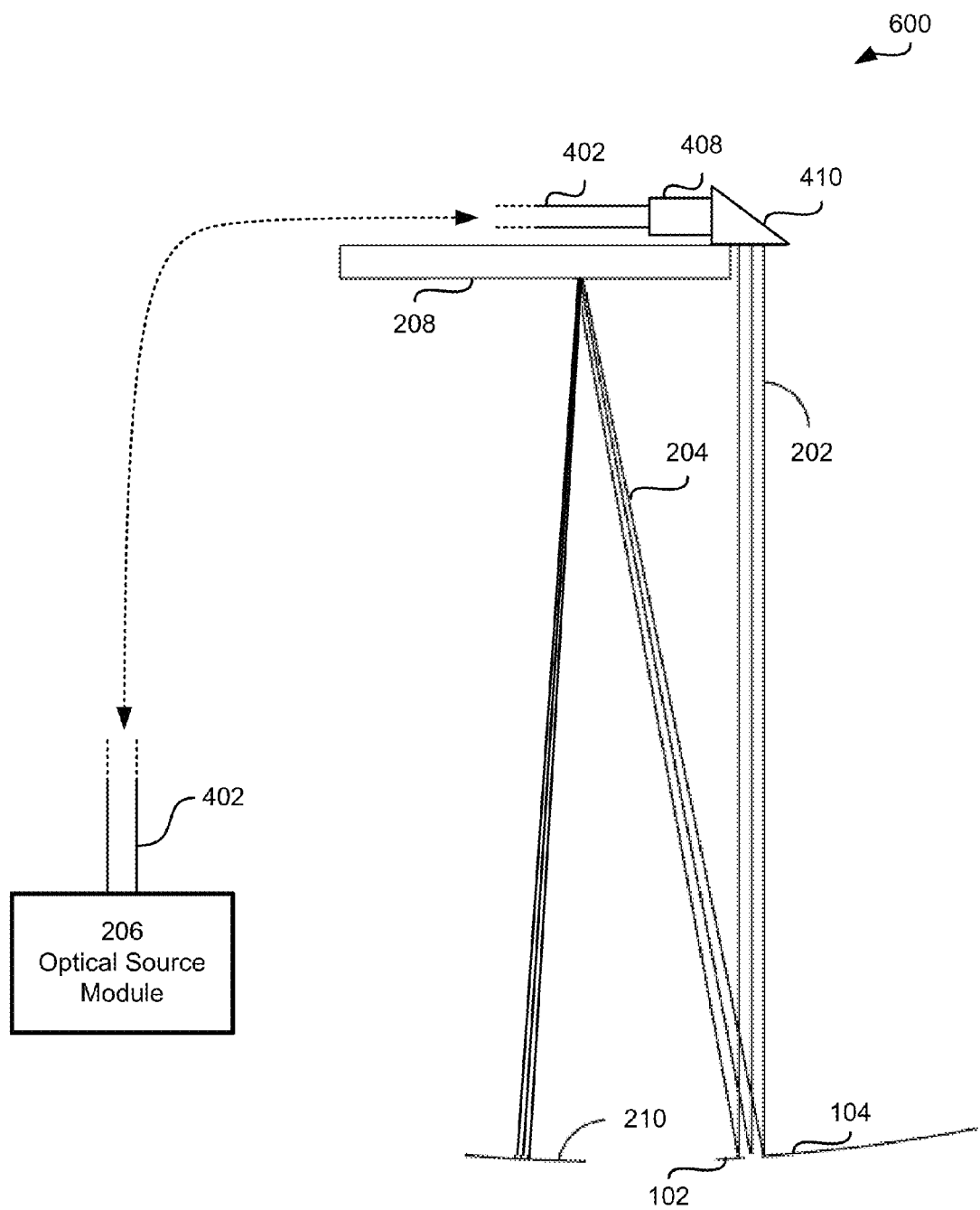
FIG. 6 is a representation of portions of an optical device.

FIG. 6 shows another example optical device configuration 600 employing a remote optical source system 400 as previously described with reference to FIG. 4. The optical device configuration 600 includes collimating optic 408 (e.g., a collimating lens) and a folding optic 410 (e.g., a fold prism) placed on a back of secondary optical element 208. The folding optic 410 can be placed overhanging the edge of the secondary optical element 208 so that a light beam 202 can be directed at optical segments 102, 104, similar to the optical device configuration 500 described with reference to FIG. 5. The optical source module 206 is coupled to the collimating optic 408 by optical fiber 402.

It is appreciated that other optical device configurations may be employed consistent with this disclosure. For example, the collimating module 406 can be mounted on other optical elements or the body of the optical device, for example, behind the optical segments, which may allow partial light transmission through the utilized optical surface to reflect or refract off the optical segments being aligned. Alternatively or additionally, the collimating module 406 can be embedded on the face of the secondary optical element 208. Additional example optical device configurations are described in commonly-owned U.S. Patent Publication No. 2014/0218749 filed Feb. 1, 2013, titled "SPARSE APERTURE OPTICAL ALIGNMENT AND RELATED METHODS," which is hereby incorporated herein by reference in its entirety.

The alignment procedure, in some embodiments, employs light beams 202 with varying characteristics to accurately align optical segments 102, 104. For example, light beams 202 with varying coherence lengths may be employed. Varying the coherence length of the light employed to form light beam 202 is advantageous because each coherence length has a tuning envelope (e.g., a range of offsets that can be recognized within the system dynamic range) and an accuracy level. Coherence path lengths with larger tuning envelopes generally have lower accuracy while coherence path lengths with smaller tuning envelops have higher accuracy. Varying the coherence path length to align the optical segments takes advantage of the strong points of each coherence path length. Coherence length L is described by equation (1) below:

$$L = \frac{2 \ln(2)}{\pi n} \frac{\lambda^2}{\Delta\lambda} \quad (1)$$

In equation (1), $\lambda$ is the central wavelength of the light, n is the refractive index of the medium, and $\Delta\lambda$ is the spectral content width of the light (here expressed usually as the 1/e diameter). The coherence length L may be measured using a Michelson interferometer and is the optical path length difference of a self-interfering laser beam which corresponds to a fringe visibility of 1/e (i.e., approximately 37%) where fringe visibility V is described by equation (2) below:

$$V = \frac{I_{max} - I_{min}}{I_{max} + I_{min}} \quad (2)$$

In equation (2), $I_{max}$ is the maximum intensity and $I_{min}$ is the minimum intensity.

In one embodiment, the optical source module 206 employs a plurality of modes to align the optical segments. Each of the modes aligns the optical segments employing a light beam 302 with a particular coherence path length. The modes may include a coarse alignment mode employing light with a long coherence path length, a medium alignment mode employing light with a medium coherence path length, and a fine alignment mode employing light with a short coherence path length. The optical source module 206 may employ the course alignment mode with a large tuning envelope and a lower level of accuracy to roughly align the optical segments. The medium alignment mode may be employed after the course alignment mode with a smaller tuning envelope and improved accuracy to improve the alignment of the optical segments. The fine alignment mode may be employed subsequent to the medium alignment mode with the smallest tuning envelope and highest accuracy to precisely align the optical segments.

As described above, the optical source module 206 may employ light with varying coherence path lengths within a plurality of modes to accurately align the optical segments. Table 1 below illustrates an example set of alignment modes and the associated characteristics of the light employed in the mode.

TABLE 1

| Alignment Mode | $\lambda$ (μm) | $\Delta\lambda$ (μm) | L (μm) | Accuracy (μm) |
|---|---|---|---|---|
| Coarse | 780 | 25 | 10.7 | 1.1 |
| Medium | 470 | 20 | 4.9 | 0.5 |
| Fine | 593 | 150 | 1.0 | 0.1 |

Changing the relative distance between the optical segments (e.g., the gap between optical segments 102, 104 in FIG. 1) in each of the modes illustrated in Table 1 yields a similar set of image patterns within the tuning envelope. Table 2 illustrates the relationships between the image patterns detected by the detector 210 (shown in FIG. 7), the relative position of the optical segments, and the alignment mode:

TABLE 2

Figure 7A:
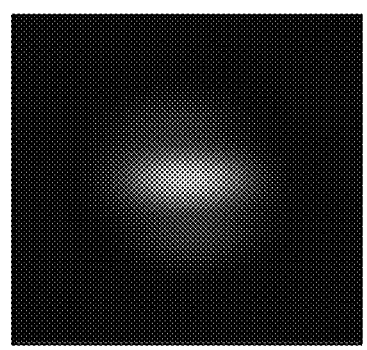
FIGS. 7A-7E are example image pattern outputs of an optical device.
Figure 7B:
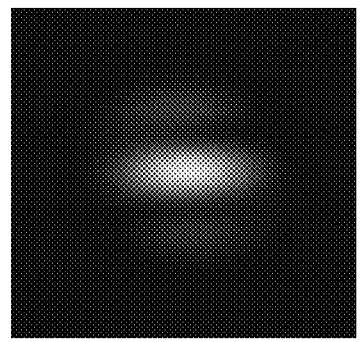
Figure 7C:
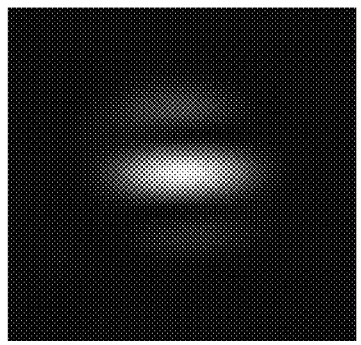
Figure 7D:
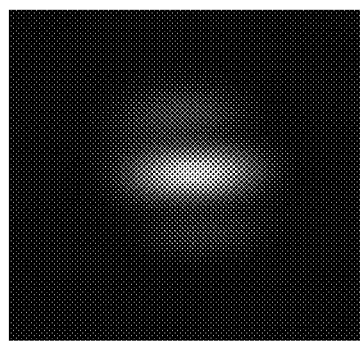
Figure 7E:
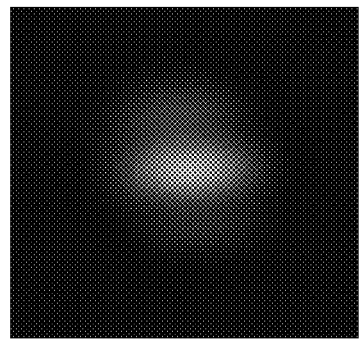

| Alignment Mode | Position 1 (μm) Low Contrast | Position 2 (μm) Medium Contrast | Position 3 (μm) Null | Position 4 (μm) Medium Contrast | Position 5 (μm) Low Contrast |
|---|---|---|---|---|---|
| Coarse | −10.7 | −5.4 | 0.0 | 5.4 | 10.7 |
| Medium | −4.9 | −2.4 | 0.0 | 2.4 | 4.9 |
| Fine | −1.0 | −0.5 | 0.0 | 0.5 | 1.0 |
| Interference Pattern | FIG. 7A | FIG. 7B | FIG. 7C | FIG. 7D | FIG. 7E |

As illustrated by Tables 1 and 2 in addition to FIG. 7, the coarse tuning mode covers the largest tuning envelope while having less precision (e.g., a large gap change yields a small image pattern change), the fine tuning mode has the smallest envelope with the most precision (e.g., a small gap change yields a large image pattern change), and the medium alignment mode is in-between the coarse and fine tuning modes.

In some embodiments, the optical device module 202 combines light from various light sources to generate light with varying coherence path lengths for multiple alignment modes. FIG. 8A shows an example optical source module 206 coupled to optical fiber 402. The optical source module 206 includes light sources 802 and 804, optional light sources 806 and 808, a combiner 820, and optional combiners 822 and 824. The optical source module 206 turns on and off the various light sources to generate light with the appropriate characteristics (e.g., coherence path length). For example, the optical source module 206 may turn on only light source 802 to generate a first beam of light, turn on only light source 804 to generate a second beam of light, and turn on both light sources 802 and 804 to generate a third beam of light. Additional light sources illustrated by optional light sources 806 and 808 may be added in combination with the optional combiners 822 and 824 to generate light with a wider range of characteristics.

FIG. 8B illustrates another example optical source module 206 coupled to optical fiber 402. The optical source module 306 includes light source 810, optional light source 812, optional combiner 826, and light filter 828. The light source 810 may be a broad spectrum light source and the optical source module 206 may filter the broad spectrum light with light filter 828 to generate light with a set of characteristics (e.g., a specific coherence path length). The optical source module 206 may generate light for multiple modes by employing a configurable light filter. Additional light sources may be employed as illustrated by optional light source 812 and optional combiner 826.

Figure 9:
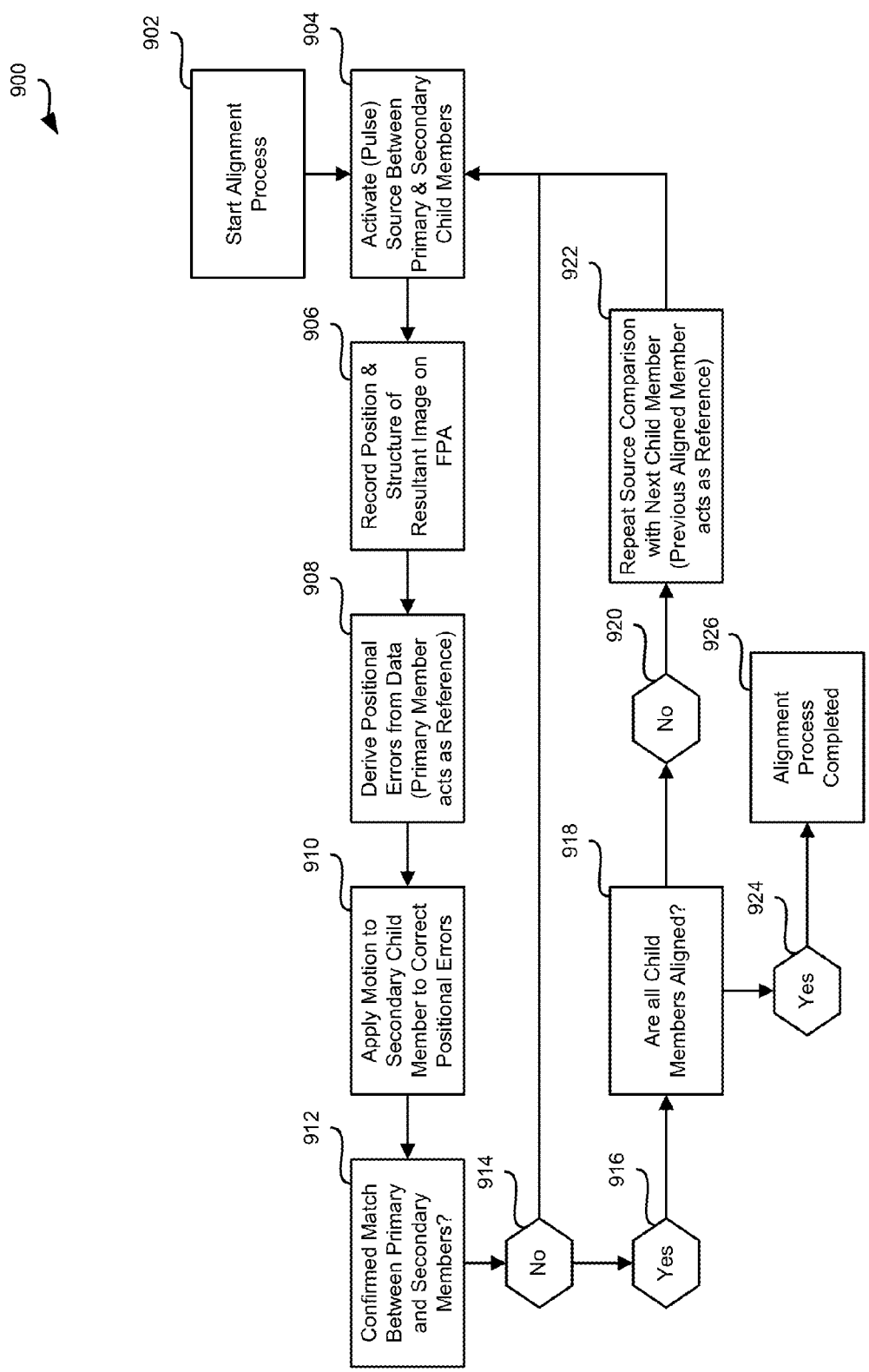
FIG. 9 is a flow chart of an example process of aligning an optical device according to embodiments of the present disclosure.

As discussed above, various interferometer alignment techniques may be employed to align optical segments. FIG. 9 shows a flow chart of an example interferometer process 900. The alignment process 900 starts at 902. At 904, active optical sources are activated between optical segments. The active optical sources can be pulsed between a first optical segment and a second optical segment. The first optical segment can be a primary child member used as a reference surface. The second optical segment can be a secondary child member used as a test surface. At 906, a position and structure of a resultant image is recorded on a detector (e.g., FPA). At 908, positional errors are derived from the position and structure of the recorded image. At 910, motion is applied to the secondary child member to correct the derived positional errors. At 912, the alignment between the primary and secondary child members is confirmed. If no alignment is confirmed (box 914), the process returns to activating the optical sources to re-test and repeat the process (box 904). If alignment is confirmed (box 916), the alignment of all the child members is checked at 918. If not all child members are aligned (box 920), the process is repeated with the next child member at 922. The secondary child member that has been aligned is then used as the primary child member for the next adjacent optical segment. If all the child members are aligned (box 924), the alignment process is completed at 926.

Figure 10:
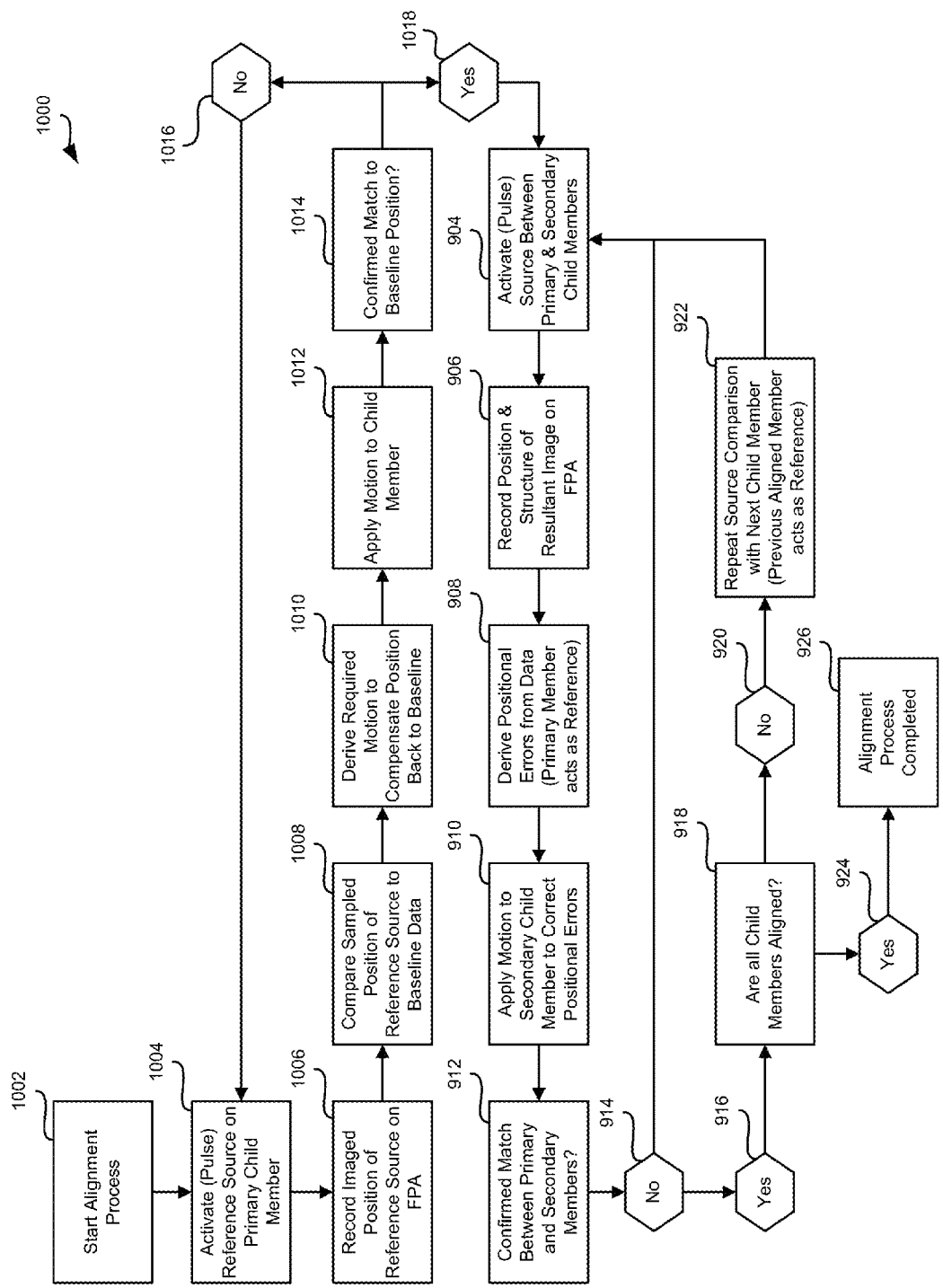
FIG. 10 is a flow chart of an example process of aligning an optical device according to embodiments of the present disclosure.

FIG. 10 shows another example interferometer process 1000. The alignment process 1000 employs a global reference to perform an approximate alignment prior to performing the steps 904-926 described above with reference to FIG. 10. The alignment process 1000 starts at 1002. At 1004, a reference source is activated on a primary child member. At 1006, a position and structure of a resultant image is recorded on a detector (e.g., FPA). At 1008, the motion required to move the child member to a baseline position is derived from the position and structure of the recorded image. At 1010, the motion derived in step 1008 is applied to the secondary child member to move the child minor back to the baseline position. At 1012, a match is evaluated between the position of the child member and the baseline position. At 1014, it is determined if the positional errors are above or below a set limit, where being below a pre-determined level would constitute a match in global alignment. If there is a match between the position of the child member and the baseline position (box 1018), the alignment process continues to steps 904-926 as described above with reference to FIG. 9. If there is not a match between the position of the child member and the baseline position (box 1016), the alignment process returns to step 1004. It is to be appreciated that these processes and the incident light source and alignment procedure can be done with any of a continuous light source, an intermittent light source, while measurements are being made with the overall device or in between measurements made with the overall device, or any combination thereof.

As described above, the interferometer procedure can be altered by employing multiple modes each employing light with a particular set of characteristics. Changing the coherence length can be used to generate characteristics of reflections that can be measured to determine the alignment of the optical segments, and specifically vary the system sensitivity to the axial displacement of the two mirror surfaces, in order to facilitate rough versus fine alignment of the minor axial positions. For example, the interferometer procedure may first utilize light with a long coherence length to coarsely align the optical segments and proceed to employ light with a shorter coherence length to finely align the optical segments.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A sparse optical system comprising:
   an optical element including a plurality of optical segments arranged in a sparse aperture configuration;
   an optical source module configured to generate a first beam of light having a first set of characteristics and a second beam of light having a second set of characteristics;
   at least one collimating module coupled to the optical source module, the collimating module configured to direct the first beam of light and the second beam of light towards at least two adjacent segments of the plurality of optical segments;
   a detector configured to receive a reflection of at least one of the first beam of light and the second beam of light from at least one of the plurality of optical segments; and
   a processor coupled to the detector and the optical source module, the processor being configured to:
      instruct the optical source module to generate the first beam of light;
      determine a first measurement of an alignment of the at least two adjacent segments based on interference patterns of the reflection of the first beam;
      adjust a position of at least one segment of the at least two adjacent segments based on the first measurement;
      instruct the optical source module to generate the second beam of light; and
      determine a second measurement of the alignment of the at least two segments based on interference patterns of the reflection of the second beam;

wherein the first measurement is a coarse measurement and the second measurement is a fine measurement.

2. The system of claim 1, wherein the optical source module includes at least a first light source to generate the first beam of light and a second light source to generate the second beam of light.

3. The system of claim 2, wherein at least one of the first light source and the second light source includes at least one of a light emitting diode, a laser, and a superluminescent diode.

4. The system of claim 2, wherein the optical source module includes a combiner constructed to combine the first beam of light with the second beam of light to form a third beam of light having a third set of characteristics.

5. The system of claim 1, wherein the optical source module includes a light source and a light filter configured to filter light from the light source.

6. The system of claim 5, wherein the light filter includes a first state and a second state, and wherein the optical source module is configured to generate the first beam of light by configuring the light filter into the first state and to generate the second beam of light by configuring the light filter into the second state.

7. The system of claim 1, wherein the first set of characteristics includes a coherence path length of at least 4.9 µm and wherein the second set of characteristics includes a coherence path length of no more than 4.9 µm.

8. The system of claim 1, further comprising an optical fiber coupled between the optical source module and the at least one collimating module.

9. The system of claim 1, wherein the at least one collimating module includes a plurality of collimating modules, and wherein the system further comprises an optical demultiplexer coupled between the optical source module and each collimating module of the plurality of collimating modules.

10. The system of claim 9, wherein each collimating module of the plurality of collimating modules is configured to direct a respective beam of light towards a unique pair of two adjacent segments, and wherein the detector is configured to simultaneously receive a reflection of the respective beams of light from each unique pair of two adjacent segments.

11. The system of claim 1, wherein the at least one collimating module includes a collimating optic, a folding optic, and an iris.

12. The system of claim 1, wherein the optical element is one of a reflective optical element and a refractive optical element.

13. The system of claim 1, wherein the processor is further configured to determine whether the alignment of the at least two adjacent segments matches a predetermined alignment based on the interference patterns of the reflection of the second beam.

14. A method for aligning a plurality of optical segments in a sparse aperture configuration of an optical device, the method comprising:
    directing a first beam of light from an optical source located on the sparse aperture optical device towards at least two adjacent segments of the plurality of optical segments;
    receiving a reflection of the first beam of light from the at least two adjacent optical segments at a detector;
    determining a first measurement of an alignment of the at least two adjacent segments based on interference patterns of the reflection of the first beam;
    adjusting a position of at least one segment of the at least two adjacent segments based on the first measurement;
    directing a second beam of light from the optical source towards the at least two adjacent segments;
    receiving a reflection of the second beam of light from the at least two adjacent optical segments at the detector; and
    determining a second measurement of the alignment of the at least two adjacent segments based on interference patterns of the reflection of the second beam.

15. The method of claim 14, further comprising adjusting the position of the at least one segment based on the second measurement.

16. The method of claim 14, further comprising filtering the first beam of light to produce the second beam of light.

17. The method of claim 14, wherein directing the first beam of light includes directing the first beam of light at a plurality of unique pairs of two adjacent segments.

18. The method of claim 17, wherein directing the second beam of light includes directing the second beam of light at the plurality of unique pairs.

19. The method of claim 14, wherein directing the first beam includes directing the first beam with a first set of characteristics, and wherein directing the second beam includes directing the second beam with a second set of characteristics.

20. A sparse optical system comprising:
    an optical element including a plurality of optical segments arranged in a sparse aperture configuration;
    an optical source module including a light source and a light filter, the optical source module configured to generate a first beam of light having a first set of characteristics and a second beam of light having a second set of characteristics;
    at least one collimating module coupled to the optical source module, the collimating module configured to direct the first beam of light and the second beam of light towards at least two adjacent segments of the plurality of optical segments;
    a detector configured to receive a reflection of at least one of the first beam of light and the second beam of light from at least one of the plurality of optical segments; and
    a processor coupled to the detector and the optical source module, the processor being configured to:
        instruct the optical source module to generate the first beam of light;
        determine a first measurement of an alignment of the at least two adjacent segments based on interference patterns of the reflection of the first beam;
        adjust a position of at least one segment of the at least two adjacent segments based on the first measurement;
        instruct the optical source module to generate the second beam of light; and
        determine a second measurement of the alignment of the at least two segments based on interference patterns of the reflection of the second beam.

21. The system of claim 20, wherein the light filter includes a first state and a second state, and wherein the optical source module is configured to generate the first beam of light by configuring the light filter into the first state and to generate the second beam of light by configuring the light filter into the second state.

* * * * *